US012248366B2

(12) United States Patent
Chonkar et al.

(10) Patent No.: US 12,248,366 B2
(45) Date of Patent: *Mar. 11, 2025

(54) SOFTWARE APPLICATION DEVELOPMENT TOOL FOR AUTOMATION OF MATURITY ADVANCEMENT

(71) Applicant: Fidelity Information Services, LLC, Jacksonville, FL (US)

(72) Inventors: Hemendra N. Chonkar, Brookfield, WI (US); Erik Ostermueller, Little Rock, AR (US); Shambhu Sinha, Bangalore (IN); Joseph Prabhakar, Danville, CA (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,162

(22) Filed: Oct. 17, 2023

(65) Prior Publication Data

US 2024/0045757 A1 Feb. 8, 2024

Related U.S. Application Data

(63) Continuation of application No. 17/551,522, filed on Dec. 15, 2021, now Pat. No. 11,836,040.

(30) Foreign Application Priority Data

Oct. 29, 2021 (IN) .............................. 202111049618

(51) Int. Cl.
*G06F 11/07* (2006.01)
*G06F 11/14* (2006.01)
(Continued)

(52) U.S. Cl.
CPC ...... *G06F 11/0793* (2013.01); *G06F 11/0781* (2013.01); *G06F 11/1433* (2013.01);
(Continued)

(58) Field of Classification Search
None
See application file for complete search history.

(56) References Cited

U.S. PATENT DOCUMENTS 6,012,152 A * 1/2000 Douik ................. G06F 11/0709
714/E11.027
9,367,810 B1 * 6/2016 Gagne ................. G06F 11/0793
(Continued)

OTHER PUBLICATIONS

Pardhe, "Dynamic Universal Maturity Assessment System", 2021, IEEE (Year: 2021).*

(Continued)

*Primary Examiner* — Hossain M Morshed
(74) *Attorney, Agent, or Firm* — FINNEGAN, HENDERSON, FARABOW, GARRETT & DUNNER LLP

(57) ABSTRACT

A method includes receiving, from a first remote device, an initial first plurality of status metrics corresponding to a first domain, each of the initial plurality of status metrics indicating whether a corresponding parameter of the first domain requires remediation. The method includes comparing the initial plurality of status metrics to a reference database, the reference database listing previously encountered problems with known remediation solutions. The method includes receiving from the first remote device, an updated plurality of status metrics corresponding the first domain, each of the updated plurality of status metrics indicating whether a corresponding parameter of the first domain requires remediation. The method includes applying an algorithm to the updated plurality of status metrics to generate a maturity score of the first domain. The method
(Continued)

includes combining the maturity score of the first domain and a maturity score of a second domain to generate a maturity report.

18 Claims, 3 Drawing Sheets

(51) Int. Cl.
    *G06F 11/30*     (2006.01)
    *G06F 11/34*     (2006.01)
    *G06F 11/36*     (2006.01)
    *G06F 11/3604*     (2025.01)
    *G06Q 10/0631*     (2023.01)

(52) U.S. Cl.
    CPC ...... *G06F 11/3072* (2013.01); *G06F 11/3452* (2013.01); *G06F 11/3616* (2013.01); *G06Q 10/06313* (2013.01)

(56) References Cited

U.S. PATENT DOCUMENTS

| | | | |
|---|---|---|---|
| 10,853,161 B2 * | 12/2020 | Ahad | G06F 11/3048 |
| 11,392,445 B2 * | 7/2022 | Balasubramanian | G06F 11/3006 |
| 2013/0007527 A1 * | 1/2013 | Petukhov | G06F 11/0793 714/E11.029 |
| 2017/0235662 A1 * | 8/2017 | Leask | G06Q 10/00 717/125 |
| 2018/0039570 A1 * | 2/2018 | Rajagopalan | G06F 11/3636 |
| 2020/0327008 A1 * | 10/2020 | Singh | G06F 9/451 |
| 2021/0019247 A1 * | 1/2021 | Hurley | G06F 11/0793 |
| 2022/0004477 A1 * | 1/2022 | Dahl | G06F 11/302 |
| 2022/0038486 A1 * | 2/2022 | Baragaba | H04L 63/083 |
| 2023/0067084 A1 * | 3/2023 | Mohanty | G06F 8/77 |
| 2023/0138072 A1 * | 5/2023 | Chonkar | G06F 11/008 714/15 |

OTHER PUBLICATIONS

International Search Report and Written Opinion mailed Jan. 23, 2023 (11 pages).

Pardhe, "Dynamic Universal Maturity Assessment System", 2021, IEEE (2021) (5 pages).

* cited by examiner

SOFTWARE APPLICATION DEVELOPMENT TOOL FOR AUTOMATION OF MATURITY ADVANCEMENT

CROSS-REFERENCE TO RELATED APPLICATIONS

This application is a continuation of U.S. patent application Ser. No. 17/551,522, filed on Dec. 15, 2021, and claims the benefit of Indian Patent Application number 202111049618, filed on Oct. 29, 2021, the contents of which are hereby incorporated by reference in their entirety.

BACKGROUND

Field of the Invention

Systems and methods consistent with the present disclosure generally relate to advancing maturity of software applications. More particularly, systems and methods consistent with the disclosure relate to identifying and quantifying factors that correspond to software application maturity to enable targeted and prioritized advancement of that maturity through autonomous and manual direction.

Discussion of the Related Art

Businesses and institutions that develop and implement software applications are faced with a variety of stability and performance issues that affect a software application's reliability to perform as intended. These issues are typically addressed as they arise and as more issues are resolved, the software application's reliability improves. This is also referred to as an increase in maturity. However, given that there are a variety of different domains from which issues can arise, and potentially multiple different software applications that must be monitored, it can be difficult to know (i) a totality of what the current issues are for a given software application, (ii) how best to prioritize issues that must be addressed for a given software application, and (iii) which software applications should be given the most time and attention for improvement. Overall, there is a need to more efficiently and effectively advance the maturity of software applications that takes into account all known relevant issues.

Traditionally, improvement of enterprise level software applications has been addressed in a compartmentalized fashion. In particular, various teams/individuals have been tasked with servicing a particular domain (e.g., security, network issues, capacity, etc.) associated with a software application. Typically, each team would identify and treat issues in their particular domain according to their own methods and standards. Some teams may prioritize issues on a first come first served basis, other teams may prioritize issues based on criticality, and yet others may prioritize with respect to which issues can be most easily addressed. Teams would have little to no communication with other teams as they would be focused on their own issues.

However, there are deficiencies with the above-described conventional techniques for advancing software application maturity. For example, since there is no standardized way for characterizing and treating issues among the various domain teams, improvement is inconsistent with some teams being more effective than others at identifying and resolving issues, meaning that some applications are more advanced and more functional than others. Additionally, due the compartmentalized nature of problem solving and the lack of standardization, it is difficult for any one individual in engineering or management to understand (i) the current status of a given software application, or (ii) how the current status of a given software application compares to the current status of other software applications. Without this understanding, it can be difficult for an organization to know how to best allocate limited resources to achieve the most improvement. Another deficiency is that, due to the lack of consistent electronic communication and standardization, teams will often spend needless time and effort determining how to resolve issues that are similar to previously resolved similar issues that have known solutions.

In view of the foregoing, it is desirable to improve the efficiency and efficacy of software application maturity advancement. For example, there is a need for an improved method and system to (i) optimize the effectiveness of a domain team's ability to address issues, (i) prioritize resources across domains and software applications to most efficiently resolve issues, and (iii) harness successful previous solutions to solve new issues.

SUMMARY OF THE DISCLOSURE

A method for advancing maturity of a software application includes receiving, at a server from a first remote device, an initial first plurality of status metrics corresponding to a first domain, each of the initial first plurality of status metrics indicating whether a corresponding parameter of the first domain requires remediation; comparing the initial first plurality of status metrics to a reference database, the reference database listing previously encountered problems with known remediation solutions; receiving from the first remote device, an updated first plurality of status metrics corresponding the first domain, each of the updated first plurality of status metrics indicating whether a corresponding parameter of the first domain requires remediation; applying a first algorithm to the updated first plurality of status metrics to generate a maturity score of the first domain; combining the maturity score of the first domain and a maturity score of a second domain to generate a maturity report of the software application; and sending the maturity report to a display.

A computer-readable storage medium includes instructions for advancing maturity of a software application, which when executed on a computer processor causes the processor to perform a method. The method includes receiving, at a server from a first remote device, an initial first plurality of status metrics corresponding to a first domain, each of the initial first plurality of status metrics indicating whether a corresponding parameter of the first domain requires remediation; comparing the initial first plurality of status metrics to a reference database, the reference database listing previously encountered problems with known remediation solutions; receiving from the first remote device, an updated first plurality of status metrics corresponding the first domain, each of the updated first plurality of status metrics indicating whether a corresponding parameter of the first domain requires remediation; applying a first algorithm to the updated first plurality of status metrics to generate a maturity score of the first domain; combining the maturity score of the first domain and a maturity score of a second domain to generate a maturity report of the software application; and sending the maturity report to a display.

A system of for advancing maturity of a software application includes a display and a processor. The processor is configured to receive, at a server from a first remote device, an initial first plurality of status metrics corresponding to a first domain, each of the initial first plurality of status metrics indicating whether a corresponding parameter of the first domain requires remediation; compare the initial first plurality of status metrics to a reference database, the reference database listing previously encountered problems with known remediation solutions; receive from the first remote device, an updated first plurality of status metrics corresponding the first domain, each of the updated first plurality of status metrics indicating whether a corresponding parameter of the first domain requires remediation; apply a first algorithm to the updated first plurality of status metrics to generate a maturity score of the first domain; combine the maturity score of the first domain and a maturity score of a second domain to generate a maturity report of the software application; and send the maturity report to the display.

BRIEF DESCRIPTION OF THE DRAWINGS

The accompanying drawings, which are incorporated in and constitute a part of this disclosure, illustrate various embodiments and aspects of the present disclosure. In the drawings.

DETAILED DESCRIPTION

Figure 1:
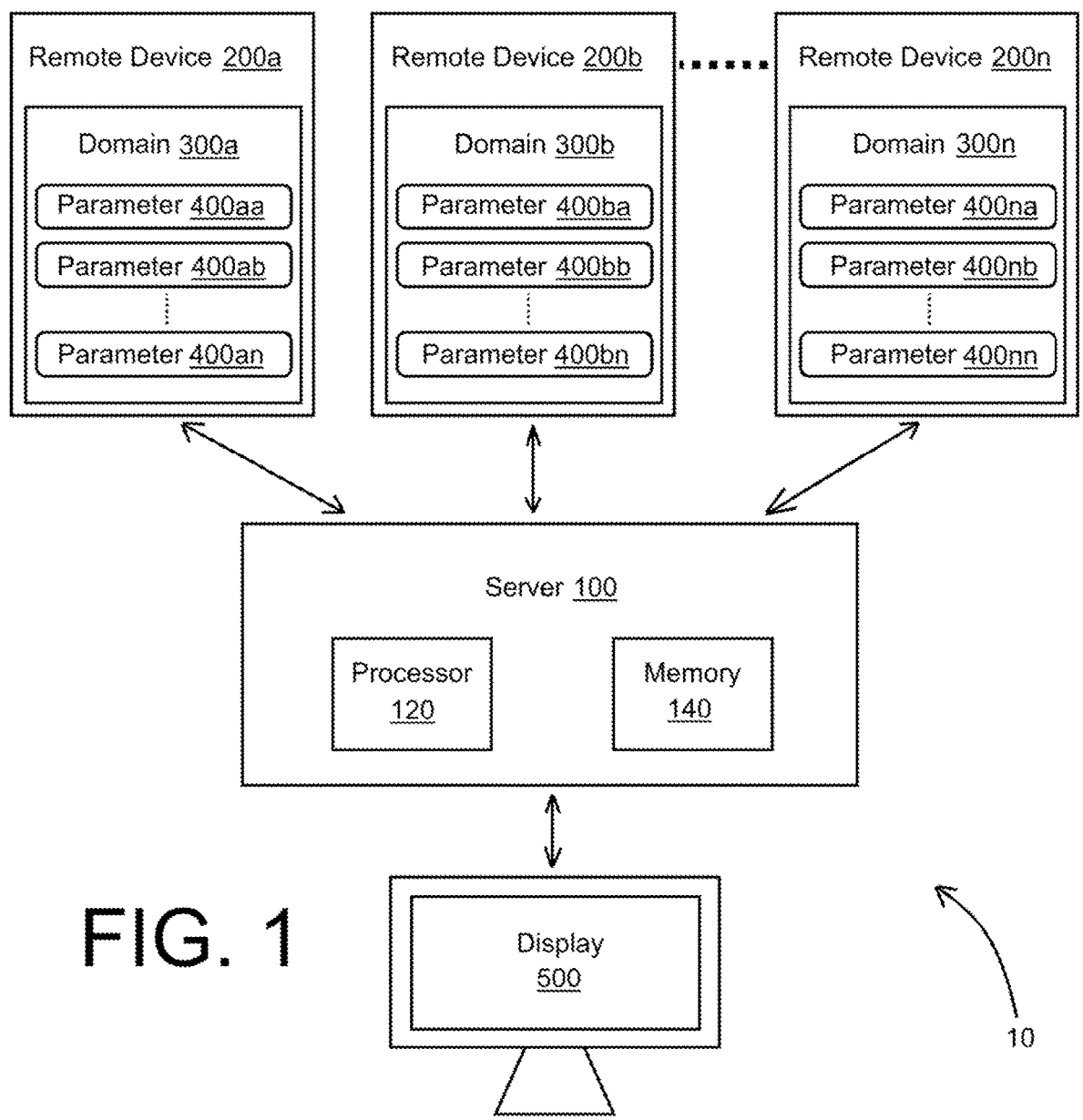
FIG. 1 is a diagram of a system for advancing maturity of software applications, consistent with the disclosed embodiments.

The following detailed description refers to the accompanying drawings. Wherever possible, the same reference numbers are used in the drawings and in the following description to refer to the same or similar parts. While several exemplary embodiments and features of the invention are described herein, modifications, adaptations, and other implementations are possible without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the present disclosure generally relate to advancing maturity of software applications.

An example of a computer system consistent with the present invention is shown in FIG. 1. FIG. 1 shows a computer system 10 having a server 100, a plurality of remote devices 200a-n, and a display 500.

Server 100 and each of the remote devices 200, in some embodiments, may be a general purpose computer, a personal computer, a workstation, a mainframe computer, a notebook, a global positioning device, a laptop computer, a smart phone, a tablet computer, a personal digital assistant, a network server, and any other electronic device that may interact with a user to develop programming code.

Although not shown, the various components of the server 100 or each remote device 200 need not be fully contained within a single device. Each of the components may be physically separated from another and more than one of the components may be used to perform methods consistent with the present invention. Even though the components may be physically separated, the components may still be communicably connected by means of wired or wireless technology. For example, different components of system 100 and user device 105 may be connected through the Internet, a LAN (local area network), a WAN (wide area network), databases, servers, RF (radio frequency) signals, cellular technology, Ethernet, telephone, "TCP/IP" (transmission control protocol/internet protocol), and any other electronic communication format.

The basic components of the server 100 include processor 120, and memory device 140, although the server 100 may contain other components including those components that facilitate electronic communication. Other components may include user interface devices such as an input and output devices (not shown). The server 100 may include computer hardware components such as a combination of Central Processing Units (CPUs) or processors, buses, memory devices, storage units, data processors, input devices, output devices, network interface devices, and other types of components that will become apparent to those skilled in the art. Server 100 may further include application programs that may include software modules, sequences of instructions, routines, data structures, display interfaces, and other types of structures that execute operations of the present invention.

One of the hardware components in server 100 is processor 120. Processor 120 may be an ASIC (Application Specific Integrated Circuit) or it may be a general purpose processor. Processor 120 may include more than one processor. For example, processors may be situated in parallel, series, or both in order to process all or part of the computer instructions that are to be processed.

Memory device 140 may include all forms of computer-readable storage mediums such as non-volatile or volatile memories including, by way of example, semiconductor memory devices, such as EPROM, RAM, ROM, DRAM, EEPROM, and flash memory devices; magnetic disks such as internal hard disks and removable disks; magneto-optical disks; DVD disks, and CD-ROM disks. Memory device 140 may be used to store program code 145, business processes 150, or business rules 155.

Display device 500 may be any conventional user interface display device. For example, display device 500 may include computer monitors, televisions, and LCD displays. Display device 500 may display GUI (Graphical User Interface) 520 which allows a user to interact with computer system 10 hardware and software applications embodied in the server 100.

As seen in FIG. 1, each of the remote devices 200a-n is associated with a different domain 300a-n. Each of the domains 300 correspond to a different area of operational concern regarding software development associated with a particular software application. Example domains include (but are not limited to): performance, infrastructure, incidents, security, continuous integration and continuous deployment (CICD), site reliability engineering (SRE), network, monitoring, capacity, resilience, etc. Particular individuals or teams may be responsible for a corresponding domain 300. While FIG. 1 shows a single domain 300 of a single software application being associated with a single remote device 200, there may be other arrangements. For example, a domain 300 for multiple software applications may be located on a single remote device 200 or a domain 300 for a single software application may be distributed among multiple remote devices 200.

Each domain 300 is evaluated by a plurality of measurements or values (i.e., parameters 400). This evaluation may be done by individual teams responsible for each domain or by automated actions of the respective remote device(s) 200. A series of automated jobs are run at periodic intervals to collect data regarding the parameters 400 (e.g., 400*aa*-400*an*, 400*ba*-400*bn*, 400*na*-400*nn*) of each domain 300 to generate a plurality of status metrics 410 corresponding to each of the parameters 400. These status metrics 410 are then subjected to extract, transform, load (ETL) processing as they are transferred to the server 100. This allows for the normalization of status metric 410 values so that they can be easily compared to each other.

Once transferred to the server 100, the processor 120 can direct the normalized scores of the various status metrics 410 to be displayed to a user on the display 500. The user can then make decisions for remediation based on this displayed information. Additionally, the processor 120 can direct the various status metrics 410 for a given domain 300 to be compared with data in a database 160 stored in the memory 140. The database 160 contains a record of previously encountered issues/problems/errors along with any known solutions. The comparison of status metrics 410 with the data in the database 160 may be assisted by artificial intelligence (AI) and/or machine learning (ML). If any of the status metrics 410 are determined to have known solutions, the processor 120 may direct a signal to be sent to the remote device 200 associated with the parameter 400 that has an issue with a known solution. This known solution can then either be automatically applied to remediate the issue or the known solution can be scheduled, integrated, tested, and optimized to implement. After automatic remediation, an updated status metric 410 can be sent to the server 100 and an updated normalized score can be sent to the display 500.

For example, one domain 300*a* for a specific software application may be the domain of security. The security domain relates to an ability of the software application to repel unauthorized use and/or alteration. The responsibility for developing, monitoring, and improving security for that software application may lie in the hands of dozens of engineering teams. Each of those teams may be responsible for a particular parameter 400 in the security domain. Some of those parameters 400 in the security domain may include: (i) authentication logging: security information and event management (SIEM), (ii) denial of service (DoS) protection, (iii) strong authentication, (iv) severe code vulnerabilities, (v) air gap, (vi) issued certificates, (vii) DNS ownership, (viii) moderate code vulnerabilities, (ix) open source software (OSS) code vulnerabilities, and (x) white hat hacker discovered vulnerabilities.

In the example above, one of the potential parameters 400 for the security domain is authentication logging: SIEM. SIEM assess logs and further divides them as a Security, Capacity or other issues. Examples of SIEM systems are Fireeye, and Splunk. Generally, a software application has better security if the servers hosting that software application have SIEM logging enabled. To track this parameter 400, an automated job may be run, for example, monthly to determine how many of the software application's servers have SIEM logging enabled. A scan may determine that 475 out of 500 servers have SIEM logging enabled. When this information is transferred to the server and undergoes ETL processing, the status metric 410 of 475/500 is normalized in a manner that can be easily compared with other status metrics 410 in the security domain. For example, one type of normalization would categorize all status metrics 410 into a value from zero to four with zero indicating that the parameter 400 is in need of immediate remediation and scores higher than 3 indicating that the parameter 400 has only a limited scope for improvement. In the above SIEM example, one way of creating a normalized score would be to divide 475 by 500 and multiply that result by four. This would give a score of 3.8 and indicate that the software authentication SIEM parameter has a high level of maturity and that engineering resources could be focused on lesser lower scoring parameters 400.

Additionally, in the example above, a comparison of the status metric 410 with the data in database 160 of the server 100 could show a known solution to the problem of disabled SIEM logging (i.e., to enable SIEM logging). The processor 120 could then direct a signal to be sent to the remote device(s) 200 associated with the security domain. That signal could then trigger an automatic adjustment of all application servers with SIEM logging disabled to enable SIEM logging. This would result in an updated status metric 410 of 500/500 and an updated normalized score of 4.0.

In the security domain, another parameter 400 may be DoS protection. DoS protection systems redirect a specific URL using a cloud based Edge Server to avoid traffic overload on a specific website domain name. Example DoS protection system is Akamai. Generally, a software application has better security if the critical URL's are pointed to a DoS protection system. To track this parameter 400, an automated job may be run, for example, monthly to determine how many of the software application's URLs are pointed towards a DoS protection system. A scan may determine that 18 of 20 URLs are pointed toward a DoS protection system. When this information is transferred to the server 100 and undergoes ETL processing, the status metric 410 of 18/20 is normalized in a manner that can be easily compared with other status metrics 410 in the security domain. Using the zero to four normalization scale previously described for the above DoS protection example, one way of creating a normalized score would be to divide 18 by 20 and multiply that result by four. This would give a score of 3.6 and indicate that the software DoS protection parameter has a high level of maturity and that engineering resources could be focused on lesser lower scoring parameters 400.

Additionally, in the example above, a comparison of the status metric 410 with the data in database 160 of the server 100 could show a known solution to the problem of non DoS protected URLs. The processor 120 could then direct a signal to be sent to the remote device(s) 200 associated with the security domain. That signal could then trigger an automatic adjustment of all URLs not pointed to a DoS protection system to point to a DoS protection system. This would result in an updated status metric 410 of 20/20 and an updated normalized score of 4.0.

In the security domain, another parameter 400 may be strong authentication. Strong authentication relates to 1 or more authentication methods, also known as multi factor authentication (MFA). Strong authentication uses a combination of passwords with user specific PINs for end user logins or administration purposes. Generally, a software application has better security if MFA is implemented and risk management information systems (RMIS) status category is NULL or RMIS status value is closed. For example, a normalization score=4 if (i) MFA implemented and RMIS category is NULL or RMIS status value is closed, or (ii) if MFA not implemented and RMIS status value is closed); a normalization score=3 if MFA implemented and RMIS category is not NULL and RMIS status value is Risk Accepted; a normalization score=2 if MFA implemented and RMIS category is not NULL and RMIS status value is Open; a normalization score=1 if MFA is not implemented and RMIS category is not NULL and RMIS status value is Risk Accepted; and a normalization score=0 if MFA not implemented and RMIS category is not NULL and RMIS status value is Open.

In the security domain, another parameter 400 may be severe code vulnerabilities. Severe code vulnerability systems utilize static application security testing. Nightly scanning of BitBucket and other repositories may locate suspected security defects based on patterns in source code. Without SAST OWASP, there is no early-warning system to detect when critical security code defects creep into developer codebases or git repositories. Example severe code vulnerability systems are Checkmarx and Veracode. Generally, a software application has better security if a severe code vulnerability system detects no vulnerabilities. For example, a normalization score=4 if a severe code vulnerability count is zero; a normalization score=3 if a severe code vulnerability count is between one and two; a normalization score=2 if a severe code vulnerability count is between three and four; a normalization score=1 if a severe code vulnerability count is between five and eight; and a normalization score=0 if a severe code vulnerability count is nine or more.

In the security domain, another parameter 400 may be air gap. Air gap is the clear text segment of an encrypted network that provides troubleshooting and 'other' purposes. Troubleshooting problems is nearly impossible without an air gap where inbound/outbound network traffic is encrypted on all network segments. The unencrypted data that crosses the air gap provides an unencrypted (but still protected) clear text network segment required for such troubleshooting. Generally, a software application has better security if the internet facing URL's have air gaps. To track this parameter 400, an automated job may be run, for example, monthly to determine how many of the software application's internet facing URLs include air gaps. A scan may determine that 20 of 20 internet facing URLs include air gaps. When this information is transferred to the server 100 and undergoes ETL processing, the status metric 410 of 20/20 is normalized in a manner that can be easily compared with other status metrics 410 in the security domain. Using the zero to four normalization scale previously described for the above air gap example, one way of creating a normalized score would be to divide 20 by 20 and multiply that result by four. This would give a score of 4 and indicate that the software air gap parameter has an optimized level of maturity.

In the security domain, another parameter 400 may be issued certificates. The parameter of issued certificates details whether an internet-facing URL's SSL certificate is registered to an employee the software application developer, so that the developer-employee is authorized to make changes such as extending a certification's expiration date. Remediating certificate issues (like basic expiration) is trivial when the developer is the registered owner of the certificate but complicated and unpredictable when other parties (like vendors and/or customers) must be identified and coordinated to implement certificate changes. To track this parameter 400, an automated job may be run, for example, monthly to determine how many of the software application's internet facing URLs have developer owned certificates. A scan may determine that 10 of 20 internet facing URLs have developer owned certificates. When this information is transferred to the server 100 and undergoes ETL processing, the status metric 410 of 10/20 is normalized in a manner that can be easily compared with other status metrics 410 in the security domain. Using the zero to four normalization scale previously described for the above developer owned certificate example, one way of creating a normalized score would be to divide 10 by 20 and multiply that result by four. This would give a score of 2 and indicate that the software developer owned certificate parameter has a lower level of maturity that is in need of remediation.

In the security domain, another parameter 400 may be developer DNS ownership. Developer DNS ownership details whether a server's DNS server(s) are operated by the developer, so that the developer is able to remediate any functional or performance issues. To track this parameter 400, an automated job may be run, for example, monthly to determine how many of the servers are pointed towards developer owned DNS servers. A scan may determine that 80 of 100 servers are pointed toward a developer owned DNS server. When this information is transferred to the server 100 and undergoes ETL processing, the status metric 410 of 80/100 is normalized in a manner that can be easily compared with other status metrics 410 in the security domain. Using the zero to four normalization scale previously described for the above developer DNS ownership example, one way of creating a normalized score would be to divide 80 by 100 and multiply that result by four. This would give a score of 3.2 and indicate that the software DoS protection parameter has a relatively high level of maturity and that engineering resources could be focused on lesser lower scoring parameters 400.

In the security domain, another parameter 400 may be moderate code vulnerabilities. Moderate code vulnerability systems utilize static application security testing. Nightly scanning of BitBucket and other repositories may locate suspected security defects based on patterns in source code. Without SAST OWASP, there is no early-warning system to detect when critical security code defects creep into developer codebases or git repositories. Example moderate code vulnerability systems are Checkmarx and Veracode. Generally, a software application has better security if a moderate code vulnerability system detects no vulnerabilities. For example, a normalization score=4 if a moderate code vulnerability count is zero; a normalization score=3 if a moderate code vulnerability count is between one and nine; a normalization score=2 if a moderate code vulnerability count is between ten and nineteen; a normalization score=1 if a moderate code vulnerability count is between twenty and twenty nine; and a normalization score=0 if a moderate code vulnerability count is thirty or more.

In the security domain, another parameter 400 may be OSS code vulnerabilities. OSS code vulnerability systems manage security, license compliance, and code quality risks that come from the use of open source in applications and containers. If an OSS code vulnerability system has flagged the open source aspects of the software application as low, the software application is highly vulnerable to security threats. An example OSS code vulnerability system is Black Duck. Generally, a software application has better security if an OSS code vulnerability system detects no vulnerabilities. For example, a normalization score=4 if a sum of all vulnerabilities is between zero and three and a critical detect threshold is zero; a normalization score=3 if a sum of all vulnerabilities is between four and eight and a critical detect threshold isn't more than four; a normalization score=2 if a sum of all vulnerabilities is between nine and twenty one and a critical detect threshold isn't more than eight; a normalization score=1 if a sum of all vulnerabilities is between twenty two and fifty; and a normalization score=0 if a sum of all vulnerabilities is fifty one or more.

In the security domain, another parameter 400 may be white hat hacker discovered vulnerabilities. White hat hacker discovered vulnerability systems detect vulnerabilities and misconfigurations. Without such a system's runtime penetration testing, hackers may be able to first discover and exploit unauthenticated security vulnerabilities. An example white hat hacker discovered vulnerability system is Qualys. Generally, a software application has better security if a white hat hacker discovered code vulnerability system detects no vulnerabilities. For example, a normalization score=4 if a severe code vulnerability count is zero; a normalization score=3 if a severe code vulnerability count is between one and two; a normalization score=2 if a severe code vulnerability count is between three and four; a normalization score=1 if a severe code vulnerability count is between five and eight; and a normalization score=0 if a severe code vulnerability count is nine or more.

In another example, one domain 300 for a specific software application may be the domain of site reliability engineering (SRE). The SRE domain involves the use of software driven and automated operations management of the software application. Some of the parameters 400 in the SRE domain may include: (i) web thread pool, (ii) name server caching daemon (NSCD) installed, (iii) Java virtual machine argument (JVMArg) recommendation, (iv) domain name system (DNS) configuration, (v) unsupported JVMArg, (vi) debugging enabled, (vii) open file limit, (viii) .net common language runtime (CLR) garbage collector (GC), (ix) Autoconfig tool, (x) Java database connectivity (JDBC) connection timeout, (xi) time service, and (xii) Nigel's Monitor (nmon) installed.

In the example above, one of the potential parameters 400 for the SRE domain is debugging enabled. Generally, a software application will run better if the servers hosting that software application have debugging enabled. To track this parameter 400, an automated job may be run, for example, monthly to determine how many of the software application's servers have debugging enabled. A scan may determine that 200 out of 500 servers have debugging enabled. When this information is transferred to the server and undergoes ETL processing, the status metric 410 of 200/500 is normalized in a manner that can be easily compared with other status metrics 410 in the SRE domain. Using the zero to four normalization scale previously described for the above debugging example, one way of creating a normalized score would be to divide 200 by 500 and multiply that result by four. This would give a score of 1.6 and indicate that the debugging parameter has a relatively low level of maturity and that it may be a good candidate for directing engineering resources.

Additionally, in the example above, a comparison of the status metric 410 with the data in database 160 of the server 100 could show a known solution to the problem of disabled debugging (i.e., to enable debugging). The processor 120 could then direct a signal to be sent to the remote device(s) 200 associated with the SRE domain. That signal could then trigger an automatic adjustment of all application servers with debugging disabled to enable debugging. This would result in an updated status metric 410 of 500/500 and an updated normalized score of 4.0.

In another example, one domain 300 for a specific software application may be the domain of monitoring. The monitoring domain relates to an effectiveness of identifying errors in the software application when in use. This may be done through the use of specific application monitoring tools (APM). APM instrumentation and alerting can help identify root cause of errors and reduce impact duration. The parameters 400 in the monitoring domain may include the use of specific monitoring tools such as (i) smart cloud application performance management (SCAPM); (ii) infrastructure ownership; (iii) Capacity Performance Management (CPM) coverage; (iv) Virtual Machine (VM) gap; (v) physical gap; (vi) system total; (vii) and percentage coverage.

In the example above, one of the potential parameters 400 for the monitoring domain is SCAPM. Generally, a software application has a higher level of maturity if a tool like SCAPM identifies a low level of errors. To track this parameter 400, an automated job may be run, for example, monthly to determine what the error rate was for each of the software application's servers for the previous month. A scan may determine that 300 out of 500 servers have an acceptable error rate according to the SCAPM tool. When this information is transferred to the server and undergoes ETL processing, the status metric 410 of 300/500 is normalized in a manner that can be easily compared with other status metrics 410 in the monitoring domain. Using the zero to four normalization scale previously describe for the above debugging example, one way of creating a normalized score would be to divide 300 by 500 and multiply that result by four. This would give a score of 2.4 and indicate that the SCAPM parameter is showing a moderate level of maturity with opportunity for improvement.

Additionally, in the example above, a comparison of the status metric 410 with the data in database 160 of the server 100 could show a known solution to the problem of moderate error rates (i.e., previously found fixes for some of the errors). The processor 120 could then direct a signal to be sent to the remote device(s) 200 associated with the monitoring domain. That signal could then trigger an automatic adjustment of all application servers with previously encountered and resolved errors. This could result in an updated status metric 410 of, for example, 350/500 and an updated normalized score of 2.8.

In the monitoring domain, another parameter 400 may be infrastructure ownership. Infrastructure ownership, in some embodiments, refers to when a business unit associated with a particular piece of infrastructure is not listed in the master list of modular bundles in a cloud computing service. To track this parameter 400, an automated job may be run, for example, monthly to determine how many of the servers are missing a business unit association. A scan may determine that 90 of 100 servers have a correct business unit association. When this information is transferred to the server 100 and undergoes ETL processing, the status metric 410 of 90/100 is normalized in a manner that can be easily compared with other status metrics 410 in the monitoring domain. Using the zero to four normalization scale previously described for the CPM coverage example, one way of creating a normalized score would be to divide 90 by 100 and multiply that result by four. This would give a score of 3.6 and indicate that the software infrastructure ownership parameter has a high level of maturity and that engineering resources could be focused on lower scoring parameters 400.

In the monitoring domain, another parameter 400 may be CPM coverage. CPM coverage describes the coverage that the server is covered with. To track this parameter 400, an automated job may be run, for example, monthly to determine how many of the servers have a CPM coverage value that is equal to null. A scan may determine that 90 of 100 servers have an CPM coverage value that is not equal to null. When this information is transferred to the server 100 and undergoes ETL processing, the status metric 410 of 90/100 is normalized in a manner that can be easily compared with other status metrics 410 in the monitoring domain. Using the zero to four normalization scale previously described for the CPM coverage example, one way of creating a normalized score would be to divide 90 by 100 and multiply that result by four. This would give a score of 3.6 and indicate that the software CPM coverage parameter has a high level of maturity and that engineering resources could be focused on lesser lower scoring parameters 400.

In the monitoring domain, another parameter 400 may be Virtual Machine (VM gap). VM gap describes if there is a gap of capacity reporting. To track this parameter 400, an automated job may be run, for example, monthly to determine how many of the servers have a VM gap that is equal to null. A scan may determine that 90 of 100 servers have a VM gap that is not equal to null. When this information is transferred to the server 100 and undergoes ETL processing, the status metric 410 of 90/100 is normalized in a manner that can be easily compared with other status metrics 410 in the monitoring domain. Using the zero to four normalization scale previously described for the VM gap example, one way of creating a normalized score would be to divide 90 by 100 and multiply that result by four. This would give a score of 3.6 and indicate that the software VM gap parameter has a high level of maturity and that engineering resources could be focused on lesser lower scoring parameters 400.

In the monitoring domain, another parameter 400 may be Physical gap. Physical gap describes if there is a gap of capacity reporting. To track this parameter 400, an automated job may be run, for example, monthly to determine how many of the servers are lacking sufficient resources (CPU, ram, etc.) to satisfy the load ("Physical Gap"). A scan may determine that 90 of 100 servers have a Physical gap, indicating that 10% of the servers would need additional hardware (CPU, ram, etc.) to achieve adequate capacity. When this information is transferred to the server 100 and undergoes ETL processing, the status metric 410 of 90/100 is normalized in a manner that can be easily compared with other status metrics 410 in the monitoring domain. Using the zero to four normalization scale previously described for the Physical gap example, one way of creating a normalized score would be to divide 90 by 100 and multiply that result by four. This would give a score of 3.6 and indicate that the software Physical gap parameter has a high level of maturity and that engineering resources could be focused on lesser lower scoring parameters 400.

In the monitoring domain, another parameter 400 may be system total which is calculated by averaging the normalized values for CPM coverage, VM gap, and Physical gap. For example, this metric scores the coverage of capacity planning agents on Windows/Linux servers for all servers in a given application. Lower scores are merited when fewer servers have the approved agents to capture capacity planning data.

In the monitoring domain, another parameter 400 may be percentage covered. Percent covered is calculated by dividing the normalized value of Capacity Performance Management (CPM) coverage (i.e., adequate capacity to meet performance demands) to system total and multiplying that quotient by four.

In another example, one domain 300 for a specific software application may be the domain of capacity. The domain of capacity relates to a maximum amount of information and/or services under which the software application can function with respect to hardware allocations. Some of the parameters 400 in the capacity domain may include: (i) operating system, (ii) number of CPUs, (iii) number of cores per CPU, (iv) RAM, (v) available disk space left, (vi) missing system group metadata, (vii) inaccurate role designation, (viii) onboarding documented, (ix) SME contacts, (x) automation exemption, (xi) hot plug enabled/add, (xii) too little infrastructure, and (xiii) too much infrastructure.

In the example above, one of the potential parameters 400 for the monitoring domain is available disk space left. Generally, a software application will perform better if there is sufficient free disk space. To track this parameter 400, an automated job may be run, for example, monthly to determine how many of the software application's servers have sufficient free disk space. A scan may determine that 400 out of 500 servers have an acceptable amount of free hard disk space. When this information is transferred to the server and undergoes ETL processing, the status metric 410 of 400/500 is normalized in a manner that can be easily compared with other status metrics 410 in the capacity domain. Using the zero to four normalization scale previously describe for the above debugging example, one way of creating a normalized score would be to divide 400 by 500 and multiply that result by four. This would give a score of 3.2 and indicate that the available disk space parameter has a relatively high level of maturity and that engineering resources could be focused on lesser scoring parameters 400.

Additionally, in the example above, a comparison of the status metric 410 with the data in database 160 of the server 100 could show a known solution to the problem of low disk space (i.e., allocation of additional cloud storage). The processor 120 could then direct a signal to be sent to the remote device(s) 200 associated with the capacity domain. That signal could then trigger an automatic adjustment of all application servers with low free disk space to have access to additional cloud storage. This could result in an updated status metric 410 of, for example, 500/500 and an updated normalized score of 4.0.

In the capacity domain, another parameter 400 may be missing system group metadata. This is an indication that the capacity planning team has a clearly defined and validated inventory for each of the businesses that are covered within scope and that includes everything that is hosted on premises in developer data centers. This metadata includes two fields—listing of DR servers and the other is a technical approach for disaster recovery. This score is calculated by adding the total number of Disaster Recovery (DR) servers (i.e., servers used in failover scenarios to allow for application resiliency) that are present to the total number of DR methods present, dividing that sum by the total number of servers, and multiplying that value by four.

In the capacity domain, another parameter 400 may be inaccurate role design. This is an indication that the number of servers that have role information. This score is calculated by dividing the number of servers with role information by the total number of servers, and multiplying that quotient by four.

In the capacity domain, another parameter 400 may be onboarding documented. This is an indication of an amount of training. This score is calculated by adding the total number of servers with yearly review information present to the total number of onboarded present servers, dividing that sum by the total number of servers, and multiplying that value by four.

In the capacity domain, another parameter 400 may be (Subject Matter Expert) SME Contacts. This is an indication of servers that have been reviewed by an SME. This score is calculated by adding the total number of servers that have been assigned an SME and that have received a review by the SME, dividing that sum by the total number of servers, and multiplying that value by four.

In the capacity domain, another parameter 400 may be automation exception. This is an indication automation that has been exempted out. This score is calculated by adding the total number of automation flags to the total number of servers with automation present, dividing that sum by the total number of servers, and multiplying that value by four.

In the capacity domain, another parameter 400 may be hot plug enabled/add. This is an indication of the ability to add additional CPU or RAM to servers. This score is calculated adding the total number servers with both CPU hot plug enabled and RAM hot plug enabled, dividing that sum by the total number of servers, and multiplying that value by four.

In the capacity domain, another parameter 400 may be too little infrastructure or too much infrastructure. This is an indication that resources on servers are sufficient or insufficient to run the software application effectively. After measuring how often a system exceeds CPU and memory consumption over the defined threshold, if more capacity is allocated than is used then it is categorized as too much infrastructure (vice versa for too little infrastructure). This score is calculated adding the total number servers with a recommended amount of CPU and a recommended amount of RAM, dividing that sum by the total number of servers, and multiplying that value by four.

In another example, one domain 300 for a specific software application may be the domain of performance. The domain of performance relates to a responsiveness and stability of the software application under a particular workload.

In the performance domain, one parameter 400 may be web container thread pool size. Suboptimal Java Enterprise Edition (JEE) server web thread pool size degrades application performance. Too many threads bring high resources utilization and too few threads cause congestion in request processing. This score is calculated by adding the total number servers with a pass status (e.g., a thread pool size between ten and three hundred), dividing that sum by the total number of servers, and multiplying that value by four.

In the performance domain, another parameter 400 may be Name Service Cache Daemon (NSCD) installed. NSCD provides a cache for the most common name service requests. Lack of NSCD installation leads to application performance degradation. This score is calculated by adding the total number of servers with NSCD installed, dividing that sum by the total number of servers, and multiplying that value by four.

In the performance domain, another parameter 400 may be missing system group metadata. This is an indication that the capacity planning team has a clearly defined and validated inventory for each of the businesses that are covered within scope and that includes everything that is hosted on premises in developer data centers. This score is calculated by adding the total number of DR servers that are present to the total number of DR methods present, dividing that sum by the total number of servers, and multiplying that value by four.

In the performance domain, another parameter 400 may Active Directory (AD) servers configured. AD servers must be properly configured for optimal performance. This score is calculated by adding the total number of servers configured with AD configuration, dividing that sum by the total number of servers, and multiplying that value by four.

In the performance domain, another parameter 400 may be time service configured. Time Service must be properly configured and use the standard developer time server pool to run successfully. This score is calculated by adding the total number of time service configured servers, dividing that sum by the total number of servers, and multiplying that value by four.

In the performance domain, another parameter 400 may DNS configured for Windows. Non-standard DNS configuration adversely affects application performance when accessing external endpoints. This score is calculated by adding the total number of windows servers configured with DNS configuration, dividing that sum by the total number of servers, and multiplying that value by four.

In the performance domain, another parameter 400 may DNS configured for Linux. Non-standard DNS configuration adversely affects application performance when accessing external endpoints. This score is calculated by adding the total number of Linux servers configured with DNS configuration, dividing that sum by the total number of servers, and multiplying that value by four.

In the performance domain, another parameter 400 may be Linux Open File Limit. Linux systems by default limit the number of file descriptors that a process may open to 1024 per process. This value is insufficient for JEE Web/App servers under high load and may result in thread blockage. The recommended value is 8024. This score is calculated by adding the total number of pass status servers (e.g., pass condition is a hard and soft file limit greater than 8040), dividing that sum by the total number of servers, and multiplying that value by four.

In the performance domain, another parameter 400 may be Java Virtual Machine (JVM) Argument. For optimal performance, JVM argument identified should be applied to all JVMs. This score is calculated by adding the total number of servers configured with recommended JVM argument, dividing that sum by the total number of servers, and multiplying that value by four.

In the performance domain, another parameter 400 may be Unsupported JVM Argument. Certain JVMs, such as IBM J9, accept unsupported arguments in a command line, but silently ignore them. Wrong impression of recommended JVM parameter configured leads to software application performance degradation. This score is calculated by adding the total number of pass status servers, dividing that sum by the total number of servers, and multiplying that value by four.

In the performance domain, another parameter 400 may be Java Database Connectivity (JDBC) Connection Timeout. Suboptimal JDBC Connection Timeout degrades application performance. This score is calculated by adding the total number of pass status servers (e.g., pass condition is connection time out value is less than thirty seconds), dividing that sum by the total number of servers, and multiplying that value by four.

In the performance domain, another parameter 400 may be Server in DEBUG mode. Dot NET web servers should run in DEBUG mode to avoid software application degradation. This score is calculated by adding the total number of pass status servers (e.g., pass condition is that DEBUG mode should be displayed), dividing that sum by the total number of servers, and multiplying that value by four.

In the performance domain, another parameter 400 may be server Garbage Collection (GC) efficiency for dot NET web application. Dot NET Web Applications should use Server GC setting with background garbage collection for better performance. This score is calculated by adding the total number of pass status servers (e.g., pass condition is that GC is enabled), dividing that sum by the total number of servers, and multiplying that value by four.

In the performance domain, another parameter 400 may be dot NET max connection size. The max connection parameter determines how many connections can be made to each IP address (default value is 2, which may create a bottleneck on a server that doesn't set a higher value of e.g., 24 or more) for each web application. This score is calculated by adding the total number servers with dot NET max connections, dividing that sum by the total number of servers, and multiplying that value by four.

In the performance domain, another parameter 400 may be size of /var folder in Linux system (/var size). The /var file system contains important variable data. Not having enough space in /var may adversely affect software patching and updates. This score is calculated by adding the total number of servers that are present to the total number servers configured with /var file system, dividing that sum by the total number of servers, and multiplying that value by four.

In the performance domain, another parameter 400 may be size of log file in /var folder in Linux system (/var/log size). The /var/log size contains log files from various programs. Files in /var/log may fill up the free space, and cleanup may be required when that occurs. This score is calculated by adding the total number of servers that are present to the total number servers configured with /var file system, dividing that sum by the total number of servers, and multiplying that value by four.

In the performance domain, another parameter 400 may be AD Port Check. New DNS/AD servers (TCP and UDP) should be checked for AD port connectivity. Without this connectivity, there would be an inability to swing the server's subnet to the strategic Domain Controllers. Files in /var/log may fill up the free space, and cleanup may be required when that occurs. This score is calculated by adding the total number of pass status servers (e.g., pass condition is connection time out value is less than thirty seconds), dividing that sum by the total number of servers, and multiplying that value by four.

In the performance domain, another parameter 400 may be JDBC Host URL. This involves checking if connectivity with hosts/ports are specified in WebSphere JDBC URLs, and register a fail if any of the specified hosts are not available. This score is calculated by adding the total number of pass status servers (e.g., pass condition is connection time out value is less than thirty seconds), dividing that sum by the total number of servers, and multiplying that value by four.

In the performance domain, another parameter 400 may be Dot Net Default proxy. Default proxy server must be configured in IIS settings to ensure proper connectivity. Application performance degradation may occur due to the limited number of simultaneous connections. This score is calculated by adding the total number of pass status servers (e.g., pass condition is connection time out value is less than thirty seconds), dividing that sum by the total number of servers, and multiplying that value by four.

In the performance domain, another parameter 400 may be Nigel's Monitoring (NMON). NMON is a performance monitoring tool for Unix and Linux operating systems. It collects data to aid the understanding of computer resource use, tuning options, and bottlenecks. This score is calculated by adding the total number of pass status servers (e.g., pass condition is connection time out value is less than thirty seconds), dividing that sum by the total number of servers, and multiplying that value by four.

In the performance domain, another parameter 400 may be Splunk installed. Splunk makes machine data accessible across an organization by identifying data patterns, providing metrics, diagnosing problems, and providing intelligence for business operations. Splunk should be installed to enable collection of such data. This score is calculated by adding the total number of pass status servers (e.g., pass condition is connection time out value is less than thirty seconds), dividing that sum by the total number of servers, and multiplying that value by four.

In another example, one domain 300 for a specific software application may be the domain of infrastructure. The domain of infrastructure relates to hardware, software, networks, facilities, etc., that are required to develop, test, deliver, monitor, control or support the software application. Some of those parameters 400 in the infrastructure domain may include: (i) VMotion (moving processing from one hypervisor host to another to optimize hardware usage) Composite, (ii) VMotion repeat offender, (iii) Patching, and (iv) active directory sites and services.

In the infrastructure domain, one parameter 400 may be VMotion Composite. The VMotion technology enables a virtual computer to be moved from one physical host to another, while it is running and with no interruption in service. Each VMWare guest outages can cause downtime of the software application. This score is calculated by adding the total number of servers that had at least one VMotion in the prior 28 days to the total number servers, dividing that sum by the total number of servers, and multiplying that value by four.

In the infrastructure domain, another parameter 400 may be VMotion Repeat Offender. The VMotion technology enables a virtual computer to be moved from one physical host to another, while it is running and with no interruption in service. Repeated VMWare guest outages result in multiple incidents of downtime of the software application. This score is calculated by adding the total subscores of the VMotion servers and dividing that sum by the total number of servers (for each server, subscore: 4, if VMotion repetition count is 0, subscore:3, if VMotion repetition count<=1, subscore:2, if VMotion repetition count<=2, subscore:1, if VMotion repetition count<=3, and subscore:0, if VMotion repetition count>3).

In the infrastructure domain, another parameter 400 may be patching. Keeping the OS software up to date is critical for maintaining stability and security of servers. An out-of-date OS software exposes the server to multiple risks, such as security vulnerabilities, software compatibility and stability issues. This score is calculated by adding the total number of servers that have received all critical patches, dividing that sum by the total number of servers, and multiplying that value by four.

In the infrastructure domain, another parameter 400 may be Active Directory Sites and Services. Active Directory Servers must be properly configured for optimal performance to avoid software application performance degradation. This score is calculated by adding the total number of pass status servers (e.g., pass condition is that Active Directory services are configured), dividing that sum by the total number of servers, and multiplying that value by four.

In another example, one domain 300 for a specific software application may be the domain of incidents. The domain of incidents relates to the tracking of events where the software application did not perform as intended.

Some of those parameters 400 in the incidents domain may include: (i) Incidents Duration in the past three months, (ii) Incident level in the past three months, (iii) Incident count in the past three months, and (iv) Mean time to resolve incidents (MTTR) in the past three months.

In the incidents domain, one parameter 400 may be Incidents Duration in the past three months. Duration for application incidents relates to the duration for an incident in last 90 days by which an incident was raised and closed or is still open. There is a need to reduce application incidents and even incident manifests, minimize the resolution time. If there are no incidents then score=4, if any incident duration is less than 15 mins then score=3, if any incident duration is between 15 mins to 30 mins then score=2, if any incident duration is between 30 mins to 90 mins then score=1, and for any incident duration greater than 90 mins score=0.

In the incidents domain, another parameter 400 may be Incident Level in the past three months. Depending on the level of severity, an average incident level in past 90 days for an application may be categorized, for example, as P1, P2 and P3 (corresponding to critical, high and medium severity problems respectively). There is a need to reduce application incidents and even incident manifests, minimize the resolution time. For no incident or global priority (i.e., number of clients affected by a global critical problem) is 0 then score=4, for P3 incident or global priority is 1 then then score=3, for P2 incident or global priority is 2 then score=2, and for P1 incident or global priority is 3 then score=0.

In the incidents domain, another parameter 400 may be Incidents Count in the past three months. This relates to the total number of incidents that have occurred in the last 90 days. It is desirable to lower the total incidents that occur in a software application. If total incident count in past 90 days is equal to 0, then score=4, if total incident count in past 90 days is greater than 0 and less than or equals to 2, then score=3, if total incident count in past 90 days is greater than 2 and less than or equals to 5, then score=2, and if total incident count in past 90 days is greater than 5, then score=0.

In the incidents domain, another parameter 400 may be MTTR in the past three months. MTTR depends on MTTR tiers. A baseline for mean time is based on all past incidents in the last year and very large variance from mean time calculated is considered as poor for a software application. It is therefore desirable to reduce MTTR for application incidents. If MTTR is more than the baseline MTTR (for example, one baseline may be 288 hours) then the score will be 0 and if the MTTR is less than the baseline, the score will be 4.

In another example, one domain 300 for a specific software application may be the domain of CICD. The domain of CICD relates to an effectiveness of automated tools in building, testing, and deploying the software application.

In another example, one domain 300 for a specific software application may be the domain of network. The domain of network interaction relates to an effectiveness of the software application to function within a network.

In another example, one domain 300 for a specific software application may be the domain of resilience. The domain of resilience relates to an ability of the software application to heal from an unexpected event. One parameter 400 in the resilience domain may be: Failover Implementation.

In the resilience domain, one parameter 400 may be Failover (automatically switching processing from a failed component in a critical system to its live spare or backup component) Implementation. Failover may be implemented and this may be done successfully or not successfully. Unvetted failover systems are risky. Regularly failing over (e.g., once a quarter) provides important validation that failover solutions can more reliably provide system continuity amidst a crisis. If failover is not implemented then the score will be 0 and if failover is implemented then the score will be 4.

One of ordinary skill would understand that the above-discussed domains are not intended to be limiting. Other domains and/or sub-domains are possible in certain embodiments.

Figure 2:
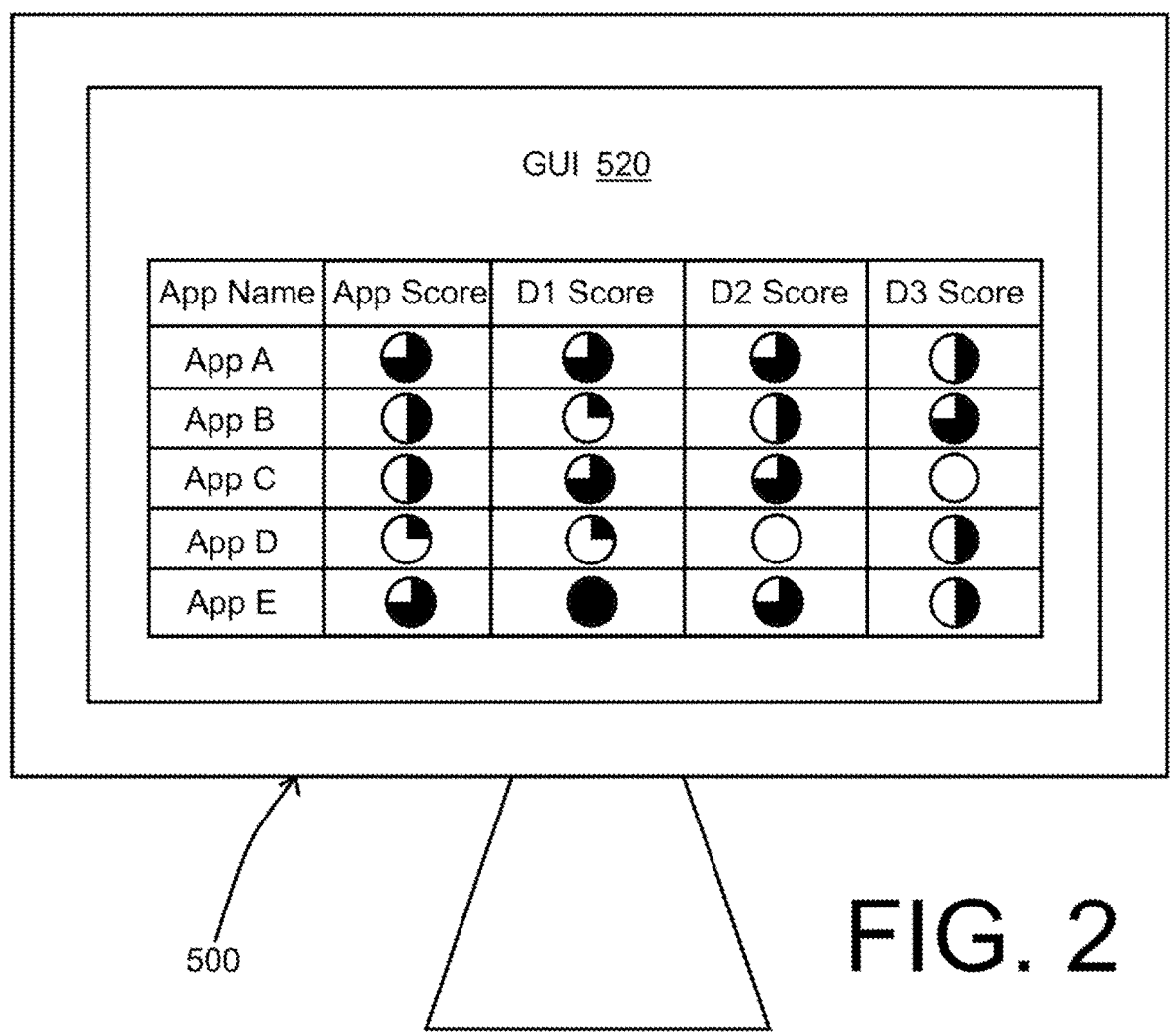
FIG. 2 depicts a display presenting normalized scores for multiple software applications in a GUI, consistent with the disclosed embodiments.

FIG. 2 depicts the display 500 presenting normalized scores for multiple software applications in the GUI 520. In addition to the normalized scores for each domain of a given software application, the GUI 520 can also display an overall maturity report or score for that software application. The domain maturity report or score may be calculated by the processor 120 by, for example, an average or a weighted average of the normalized parameter scores. In a similar way, the normalized overall application score may be calculated by processor 120 by, for example, an average or weighted average of the domain maturity reports. As seen in FIG. 2, application B has normalized scores of 1, 2, and 3 for domains 1-3 respectively. An average of those normalized scores gives the overall maturity score of 2 for application B. In addition to the scores, the GUI 520 may present additional information or interactive options. Examples include roll up and drill down capabilities on a particular domain 300 for a given application allowing for the finding of specific sets of problems to be remediated. Additionally, the GUI 520 may display a domain specific tree-view to allow for a user to view multiple levels of domain 300 at the same time.

For example, clicking on an application overall maturity score could display additional information showing (i) how the individual domain scores were weighted to generate the overall score, (ii) a summary of the most critical areas that are bringing the overall score down, (iii) recommendations for actions to take that will most effectively raise the maturity level, and (iv) selectable buttons to automatically remediate easily fixable issues.

Additionally, clicking on specific domain normalized scores could, for example, drill down to show (i) how the individual domain scores were generated from the status metric 410, (ii) a summary of the most critical areas that are bringing the domain score down, (iii) recommendations for actions to take that will most effectively raise the domain score, and (iv) selectable buttons to automatically remediate easily fixable issues within the domain.

The comprehensive information provided by the system allows for managers and engineers to more effectively communicate with each other and to understand the issues that are limiting the maturity of a given software application. For example, the system allows for institutional knowledge to more effectively utilized. If a problem has been solved in one domain, the individuals/teams responsible for other domains will be able to apply that solution for similar problems in their own domains. Additionally, time and resources can be saved by avoiding the duplication of efforts. For example, if a team responsible for the capacity domain believes that additional processing power or memory may be needed, that team can see whether there might be some other issue, for example, in the performance domain that if solved would negate the need for additional processing power or memory. The combination of automatic remediations based on previously solved issues with targeted manual remediations allow for an efficient advancement of maturity.

Figure 3:
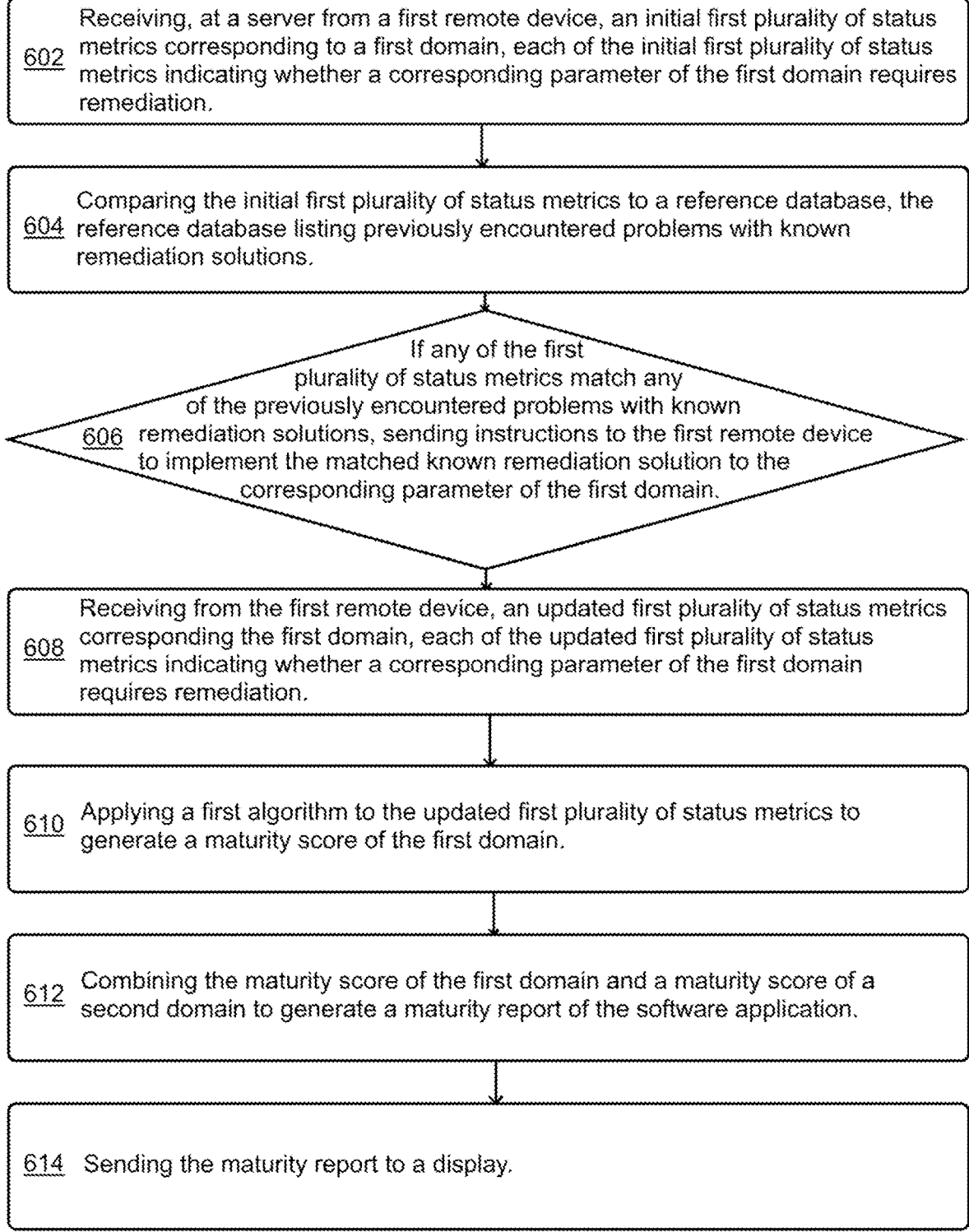
FIG. 3 is a flowchart of a method for advancing maturity of software applications, consistent with the disclosed embodiments.

FIG. 3 is a flowchart of a method 600 for advancing the maturity of a software application. The method starts at step 602

Step 602, in some embodiments, comprises receiving, at a server 100 from a first remote device 200a, an initial first plurality of status metrics 410aa-an corresponding to a first domain 300a, each of the initial first plurality of status metrics 410aa-an indicating whether a corresponding parameter 400aa-an of the first domain 300a requires remediation. For example, through APIs, scripts, and data extractions based on certain business rules 155, the processor 120 automatically extracts the status metrics 410.

Step 604, in some embodiments, comprises comparing, by a processor 120 of the server 100, the initial first plurality of status metrics 410aa-an to a reference database 160, the reference database 160 listing previously encountered problems with known remediation solutions.

Step 606, in some embodiments, comprises determining, by the processor 120 of the server 100 whether any of the first plurality of status metrics 410aa-an match any of the previously encountered problems with known remediation solutions. If so, sending instructions to the first remote device 200a to implement the matched known remediation solution to the corresponding parameter 400a of the first domain 300a.

Step 608, in some embodiments, comprises receiving, at the server 100 from the first remote device 300a, an updated first plurality of status metrics 410aa-an corresponding to the first domain 300a, each of the updated first plurality of status metrics 410aa-an indicating whether a corresponding parameter 400aa-an of the first domain 200a requires remediation.

Step 610, in some embodiments, comprises applying, by the processor 120 of the server 100, a first algorithm to the updated first plurality of status metrics 410aa-an to generate a maturity score of the first domain 200a. In some embodiments, if certain parameters 400 of a domain 300 include sensitive data (e.g., involving privacy), score calculation may take place at the domain level and results are shared via API/data extract. In some embodiments, once domain data is extracted (this may be done at periodic intervals), it may be temporarily stored in a local storage, processed via batch and then scores get stored in the memory 140 of the server 100.

Step 612, in some embodiments, comprises combining, by the processor 120 of the server 100, the maturity score of the first domain 200a and a maturity score of a second domain 200b to generate a maturity report of the software application.

Step 614, in some embodiments, comprises sending, by the processor 120 of the server 100, the maturity report to a display 500 in the GUI 520.

The benefits of the above-described embodiments such as system 10 and method 600 include the ability to cover a broad number of technical domains involved in delivering enterprise software. This coverage is not limited to just one or two areas for a single department or two but instead can extend to all technical domains associated with software development. The system 10 provides a central location for each delivery team to understand the top priorities of the top technical domain experts within an institution and how their application stacks up against those priorities.

The system 10 and method 600 provide a uniform environment where delivery teams can discover/implement remediations to improve the scores and directly advance the maturing of software applications. This enables company-wide experts to deliver expertise (in the form of targeted remediations) to a large number of delivery teams. The system 10 and method 600 are especially useful for very large businesses and institutions that may be organized as a confederation of multiple companies (e.g., large corporations with multiple subsidiaries that may have been acquired). In these type of confederations, many of the metrics that are incorporated into the system 10 and method 600 may not initially be available in all areas of the org chart. The system 10 and method 600 addresses this gap by identifying which branches of the org chart are missing metrics so that remediations can be implemented to put proper data collection in place and thus improve the efficacy of maturity advancement. Additionally, by aggregating metrics across an entire organization, users (e.g., executives) using the system 10 can see precisely which parts of the organization need investment and exactly which metrics need improvement to optimize maturity advancement of a given software application. Using the system 10, organizations can document the history of successful changes. Organizations can also establish patterns, best practices and standards. Organizations can shorten the change cycle by following these patterns, best practices, and standards. This may result in the minimization of costs and occurrences of unsuccessful changes. This may also result in accelerating digital transformation an enterprise and deliver cost savings.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for improving a status metric of a software application, comprising:
receiving, at a server from a first remote device, a first status metric corresponding to a first parameter of a first domain of the software application;
processing the first status metric to determine a first normalized score for the first status metric;
generating and sending a graphical user interface to a display, the graphical user interface including the first normalized score;
comparing the first normalized score to a reference database to determine whether the first parameter requires remediation based on the first normalized score, the reference database listing previously encountered problems with the first parameter and corresponding known remediation solutions;
generating and sending a first button for the graphical user interface to the display on a condition that a match of the first status metric exists in the reference database, wherein:
the first button is configured to send a first instruction to the first remote device to implement a first known remediation solution upon activation of the first button, and
the first known remediation solution improves the first normalized score.

2. The method of claim 1, wherein the first status metric is generated by running an automated job at periodic intervals to collect data corresponding to the first parameter.

3. The method of claim 1, wherein the processing the first status metric includes performing an extract, transform, and load process on the first status metric.

4. The method of claim 1, further comprising:
applying a first algorithm to the improved first normalized score to generate a maturity score of the first domain;
combining the maturity score of the first domain and a maturity score of a second domain to generate a maturity report of the software application; and
sending the maturity report to the display.

5. The method of claim 1, further comprising:
receiving, from a second remote device, a second status metric corresponding to a second parameter of a second domain of the software application;
processing the second status metric to determine a second normalized score for the second status metric;
comparing the second normalized score to the reference database to determine whether the second parameter requires remediation based on the second normalized score, the reference database listing previously encountered problems with the second parameter and corresponding known remediation solutions;
generating and sending a second button for the graphical user interface to the display on a condition that a match of the second status metric exists in the reference database, wherein:
the second button is configured to send a second instruction to the second remote device to implement a second known remediation solution upon activation of the second button, and
the second known remediation solution improves the second normalized score;
comparing the second normalized score to the first normalized score;
assigning a higher priority to the second status metric on a condition that the first normalized score is higher than the second normalized score, wherein a higher priority indicates sending the second instruction to the second remote device before sending the first instruction to the first remote device.

6. The method of claim 5, further comprising:
assigning the higher priority to the first status metric on a condition that the second normalized score is higher than the first normalized score, wherein the higher priority indicates sending the first instruction to the first remote device before sending the second instruction to the second remote device.

7. A non-transitory computer readable storage medium comprising instructions for improving a status metric of a software application, which when executed on a computer processor causes the processor to perform a method, the method comprising:
receiving, at a server from a first remote device, a first status metric corresponding to a first parameter of a first domain of the software application;
processing the first status metric to determine a first normalized score for the first status metric;
generating and sending a graphical user interface to a display, the graphical user interface including the first normalized score;
comparing the first normalized score to a reference database to determine whether the first parameter requires remediation based on the first normalized score, the reference database listing previously encountered problems with the first parameter and corresponding known remediation solutions;
generating and sending a first button for the graphical user interface to the display on a condition that a match of the first status metric exists in the reference database, wherein:
the first button is configured to send a first instruction to the first remote device to implement a first known remediation solution upon activation of the first button, and
the first known remediation solution improves the first normalized score.

8. The non-transitory computer readable storage medium of claim 7, wherein the first status metric is generated by running an automated job at periodic intervals to collect data corresponding to the first parameter.

9. The non-transitory computer readable storage medium of claim 7, wherein the processing the first status metric includes performing an extract, transform, and load process on the first status metric.

10. The non-transitory computer readable storage medium of claim 7, wherein the method further comprises:
applying a first algorithm to the improved first normalized score to generate a maturity score of the first domain;
combining the maturity score of the first domain and a maturity score of a second domain to generate a maturity report of the software application; and
sending the maturity report to the display.

11. The non-transitory computer readable storage medium of claim 7, wherein the method further comprises:
receiving, from a second remote device, a second status metric corresponding to a second parameter of a second domain of the software application;
processing the second status metric to determine a second normalized score for the second status metric;
comparing the second normalized score to the reference database to determine whether the second parameter requires remediation based on the second normalized score, the reference database listing previously encountered problems with the second parameter and corresponding known remediation solutions;
generating and sending a second button for the graphical user interface to the display on a condition that a match of the second status metric exists in the reference database, wherein:
the second button is configured to send a second instruction to the second remote device to implement a second known remediation solution upon activation of the second button, and
the second known remediation solution improves the second normalized score;
comparing the second normalized score to the first normalized score;
assigning a higher priority to the second status metric on a condition that the first normalized score is higher than the second normalized score, wherein a higher priority indicates sending the second instruction to the second remote device before sending the first instruction to the first remote device.

12. The non-transitory computer readable storage medium of claim 11, wherein the method further comprises:
assigning the higher priority to the first status metric on a condition that the second normalized score is higher than the first normalized score, wherein the higher priority indicates sending the first instruction to the first remote device before sending the second instruction to the second remote device.

13. A system for improving a status metric of a software application, comprising:
a display; and
a processor configured to:
receive, at a server from a first remote device, a first status metric corresponding to a first parameter a first domain of the software application;
process the first status metric to determine a first normalized score for the first status metric;
generate and send a graphical user interface to a display, the graphical user interface including the first normalized score;
compare the first normalized score to a reference database to determine whether the first parameter requires remediation based on the first normalized score, the reference database listing previously encountered problems with the first parameter and corresponding known remediation solutions;
generate and send a first button for the graphical user interface to the display on a condition that a match of the first status metric exists in the reference database, wherein:
the first button is configured to send a first instruction to the first remote device to implement a first known remediation solution upon activation of the first button, and
the first known remediation solution improves the first normalized score.

14. The system of claim 13, wherein the first status metric is generated by running an automated job at periodic intervals to collect data corresponding to the first parameter.

15. The system of claim 13, wherein the processor is further configured to:
process the first status metric by performing an extract, transform, and load process on the first status metric.

16. The system of claim 13, wherein the processor is further configured to:
apply a first algorithm to the improved first normalized score to generate a maturity score of the first domain;
combine the maturity score of the first domain and a maturity score of a second domain to generate a maturity report of the software application; and
send the maturity report to the display.

17. The system of claim 13, wherein the processor is further configured to:
receive, from a second remote device, a second status metric corresponding to a second parameter of a second domain of the software application;
process the second status metric to determine a second normalized score for the second status metric;
compare the second normalized score to the reference database to determine whether the second parameter requires remediation based on the second normalized score, the reference database listing previously encountered problems with the second parameter and corresponding known remediation solutions;
generate and send a second button for the graphical user interface to the display on a condition that a match of the second status metric exists in the reference database, wherein:
the second button is configured to send a second instruction to the second remote device to implement a second known remediation solution upon activation of the second button, and
the second known remediation solution improves the second normalized score;
compare the second normalized score to the first normalized score;
assign a higher priority to the second status metric on a condition that the first normalized score is higher than the second normalized score, wherein a higher priority indicates sending the second instruction to the second remote device before sending the first instruction to the first remote device.

18. The system of claim 17, wherein the processor is further configured to:
assign the higher priority to the first status metric on a condition that the second normalized score is higher than the first normalized score, wherein the higher priority indicates sending the first instruction to the first remote device before sending the second instruction to the second remote device.

* * * * *